United States Patent
Cahnbley et al.

(10) Patent No.: US 8,352,991 B2
(45) Date of Patent: Jan. 8, 2013

(54) SYSTEM AND METHOD FOR MODIFYING A VIDEO STREAM BASED ON A CLIENT OR NETWORK ENVIRONMENT

(75) Inventors: Jens Cahnbley, Princeton Junction, NJ (US); John William Richardson, Hamilton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1082 days.

(21) Appl. No.: 10/498,737

(22) PCT Filed: Dec. 13, 2002

(86) PCT No.: PCT/US02/39919
§ 371 (c)(1),
(2), (4) Date: Jun. 15, 2004

(87) PCT Pub. No.: WO03/053040
PCT Pub. Date: Jun. 26, 2003

(65) Prior Publication Data
US 2004/0261135 A1  Dec. 23, 2004

Related U.S. Application Data

(60) Provisional application No. 60/341,672, filed on Dec. 15, 2001.

(51) Int. Cl.
*H04N 7/173* (2011.01)
(52) U.S. Cl. .......................... 725/93; 725/116; 709/219
(58) Field of Classification Search ............ 725/87–118, 725/181, 146, 148; 209/217–231
See application file for complete search history.

(56) References Cited

U.S. PATENT DOCUMENTS

| | | | |
|---|---|---|---|
| 5,918,020 A * | 6/1999 | Blackard et al. ............... 709/228 |
| 6,006,241 A | 12/1999 | Purnaveja et al. |
| H1882 H * | 10/2000 | Asthana et al. ............... 370/503 |
| 6,175,871 B1 * | 1/2001 | Schuster et al. ............... 709/231 |
| 6,208,653 B1 * | 3/2001 | Ogawa et al. ............ 370/395.52 |
| 6,233,017 B1 | 5/2001 | Chaddha |
| 6,253,696 B1 * | 7/2001 | Mashiko ...................... 114/55.5 |
| 6,275,471 B1 * | 8/2001 | Bushmitch et al. ........... 370/248 |
| 6,421,733 B1 * | 7/2002 | Tso et al. ...................... 709/246 |

(Continued)

FOREIGN PATENT DOCUMENTS

EP  0 986 265 A2  3/2000

(Continued)

OTHER PUBLICATIONS

Search Report Dated Aug. 11, 2003.

*Primary Examiner* — Annan Shang
(74) *Attorney, Agent, or Firm* — Robert D. Shedd; Harvey D. Fried; Ronald J. Kolczynski (57) ABSTRACT

A Video Server (VS 100) encodes a video stream according to the values of parameters and transmits the video stream over a Network to a Video Client (VC 200) that decodes the received video stream for presentation to a user. As the video stream is being received, (VC 200 continually gathers data regarding at least the condition of Network sends this data to (VS 100). (VS 100) modifies the values of the parameters based on the data received from (VC 200), which in turn modifies the encoding of the video stream.

33 Claims, 4 Drawing Sheets

U.S. PATENT DOCUMENTS

| | | | |
|---|---|---|---|
| 6,445,679 B1 | 9/2002 | Taniguchi et al. | |
| 6,453,294 B1 * | 9/2002 | Dutta et al. | 704/270.1 |
| 6,470,378 B1 * | 10/2002 | Tracton et al. | 709/203 |
| 6,490,705 B1 * | 12/2002 | Boyce | 714/776 |
| 6,496,481 B1 * | 12/2002 | Wu et al. | 370/242 |
| 6,529,475 B1 | 3/2003 | Wan et al. | |
| 6,891,799 B1 | 5/2005 | Hagai et al. | |
| 6,934,756 B2 * | 8/2005 | Maes | 709/227 |
| 6,970,935 B1 * | 11/2005 | Maes | 709/230 |
| 7,260,265 B2 * | 8/2007 | Prakash et al. | 382/239 |
| 7,478,166 B2 * | 1/2009 | Agnoli et al. | 709/231 |
| 2001/0047517 A1 * | 11/2001 | Christopoulos et al. | 725/87 |

FOREIGN PATENT DOCUMENTS

| | | |
|---|---|---|
| EP | 0986265 A2 | 3/2000 |
| EP | 1 009 138 A2 | 6/2000 |
| JP | 11-266229 A | 9/1999 |
| JP | 2000-295597 A | 10/2000 |
| JP | 2001-025013 A | 1/2001 |
| WO | 9722201 A2 | 6/1997 |
| WO | WO 97/22201 | 6/1997 |
| WO | WO9843177 | 10/1998 |
| WO | WO0159706 | 8/2001 |

* cited by examiner

Fig. 1

| CPU Power Available | Frame Resolution |
|---|---|
| 76% to 100% | 640 x 480 |
| 51% to 75% | 352 x 288 |
| 26% to 50% | 320 x 240 |
| 0% to 25% | 176 x 144 |

SYSTEM AND METHOD FOR MODIFYING A VIDEO STREAM BASED ON A CLIENT OR NETWORK ENVIRONMENT

CROSS-REFERENCE TO RELATED APPLICATIONS

This application claims the benefit, under 35 U.S.C. §365 of International Application PCT/US02/39919, filed Dec. 13, 2002, which was published in accordance with PCT Article 21(2) on Jun. 26, 2003 in English and which claims the benefit of U.S. Provisional Patent Application No. 60/341,672, filed Dec. 15, 2001.

FIELD OF THE INVENTION

The invention disclosed herein relates to a system and method for delivering a video stream across a data communications network.

BACKGROUND OF THE INVENTION

The quality of the presentation at a client device of video based on a video stream received through a network can be limited by the bandwidth available in the network. Network congestion can result in data being dropped from data transmissions carried by the network. Thus, when a network experiences congestion, a video stream being carried by the network can suffer frame loss thereby resulting in degraded quality of video presented based on the video stream.

Also, the quality of the presentation at a client device of video based on a video stream received through a network can be limited by the ability of the client device to decode the video stream. Where a client device lacks the ability to fully decode a video stream that is being received, the unused data corresponds to wasted network bandwidth.

SUMMARY OF THE INVENTION

The present invention provides for a video stream being encoded according to one or more parameters and transmitted through a network to a computer to be dynamically modified during the encoding process based on conditions in the network and the ability of the computer to decode the video stream. The invention provides a method, system, and computer program product for modifying a video stream being encoded according to the values of one or more parameters and being delivered through a network. First, data related at least to the ability of the network to transport the video stream is obtained. Then, the values of the one or more parameters according to which the video stream is being encoded are modified based on the obtained data.

In an embodiment of the invention, the video stream being encoded according to the values of one or more parameters is being delivered through the network to a computer. Data related at least to the ability of the network to transport the video stream and the ability of the computer to decode the video stream is obtained. The values of the one or more parameters according to which the video stream is being encoded are then modified based on the obtained data.

According to an embodiment of the invention, the one or more parameters according to which the video stream is being encoded includes a frame resolution which is modified based on the obtained data.

In another embodiment of the invention, the one or more parameters according to which the video stream is being encoded includes a frame rate which is modified based on the obtained data.

According to another embodiment of the invention, the data related to the ability of the network to transport the video stream to the computer and related to the ability of the computer to decode the video stream is obtained through RTCP packets received from the computer.

In an embodiment of the invention, the data related to the ability of the network to transport the video stream to the computer and related to the ability of the computer to decode the video stream includes a measurement representing the computer processor power available at the computer for decoding the video stream being delivered to the computer.

In another embodiment of the invention, the data related to the ability of the network to transport the video stream to the computer and related to the ability of the computer to decode the video stream includes a measurement representing the packet loss associated with the delivery of the video stream through the network to the computer.

In another embodiment of the invention, the data related to the ability of the network to transport the video stream to the computer and related to the ability of the computer to decode the video stream includes a measurement representing the bytes transmitted and the bytes received associated with the delivery of the video stream through the network to the computer.

According to another embodiment of the invention, the data related to the ability of the network to transport the video stream to the computer and related to the ability of the computer to decode the video stream includes a measurement representing a bit error rate associated with the delivery of the video stream through the network to the computer.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Preferred embodiments of a method, system, and article of manufacture containing software programs in accordance with the present invention are described with reference to the drawings.

Figure 1:
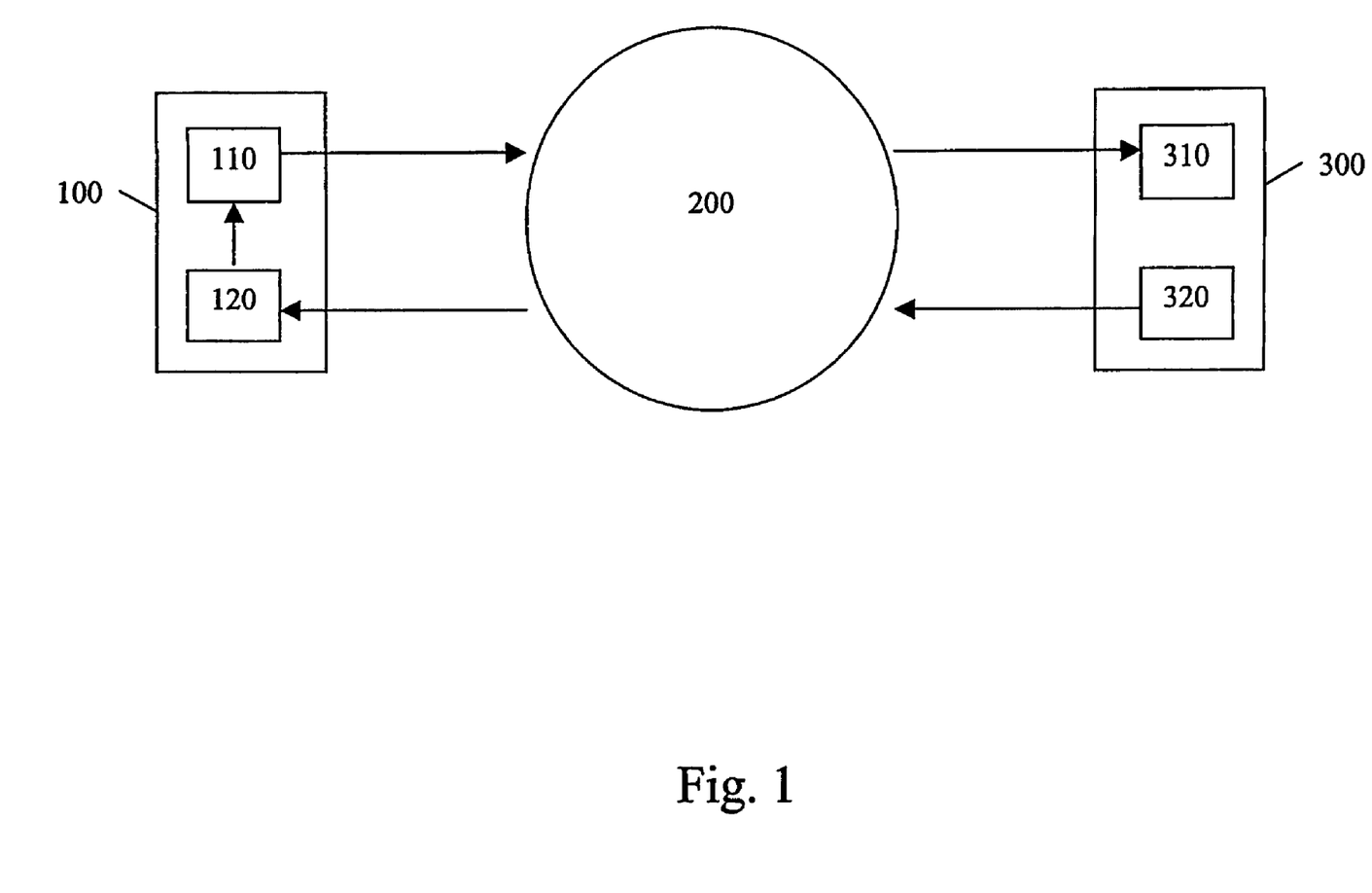
FIG. 1 is a block diagram showing an embodiment of the present invention and the environment in which it operates.

As shown in FIG. 1, a Video Server ("VS") System 100 communicates with a Video Client ("VC") System 300 through a Network 200. VS System 100 encompasses any computer system capable of (a) encoding a video stream according to one or more parameters, (b) transmitting the encoded stream to another computer through a network, (c) receiving data regarding conditions in the network and the other computer, and (d) modifying the one or more parameters based on the received data to thereby modify the encoding of the video stream. VS System 100 may comprise computer code to perform the above functions.

In an embodiment of the invention, VS System 100 comprises a Video Encoding and Transmission ("VET") System 110 and a Video Encoding Control ("VEC") System 120. VET System 100 encompasses any computer system capable of performing the encoding and transmitting functions described above, and may comprise computer code for performing those functions. For example, VET System 100 may comprise a computer system capable of encoding a video stream of any known format, e.g., MPEG and H.263, according to one or more parameters, including, for example, frame resolution and frame rate, and transmitting the video stream over a network through known techniques, for example, according to IP, TCP/IP, and UDP protocols as well as protocols related to the transport of streaming data, e.g., Real Time Streaming Protocol (RTSP), Real-Time Transport Protocol (RTP), and Real Time Control Protocol (RTCP). The one or more parameters described above may be stored, e.g., in a memory, so that they can be modified and accessed by other computer systems, e.g., VEC System 120.

VEC System 120 encompasses any computer system capable of performing the receiving and modifying functions described above, and may comprise computer code for performing those functions. For example, VEC System 120 may comprise a computer system capable of receiving data regarding conditions in the network over which the video stream is being sent and in the computer receiving the video stream as application specific data contained within RTCP packets received from the computer receiving the video stream, and modifying the one or more parameters according to which the video stream is being encoded based on tables of predefined ranges for the received data and predefined parameters values corresponding to the predefined ranges.

Figure 2:
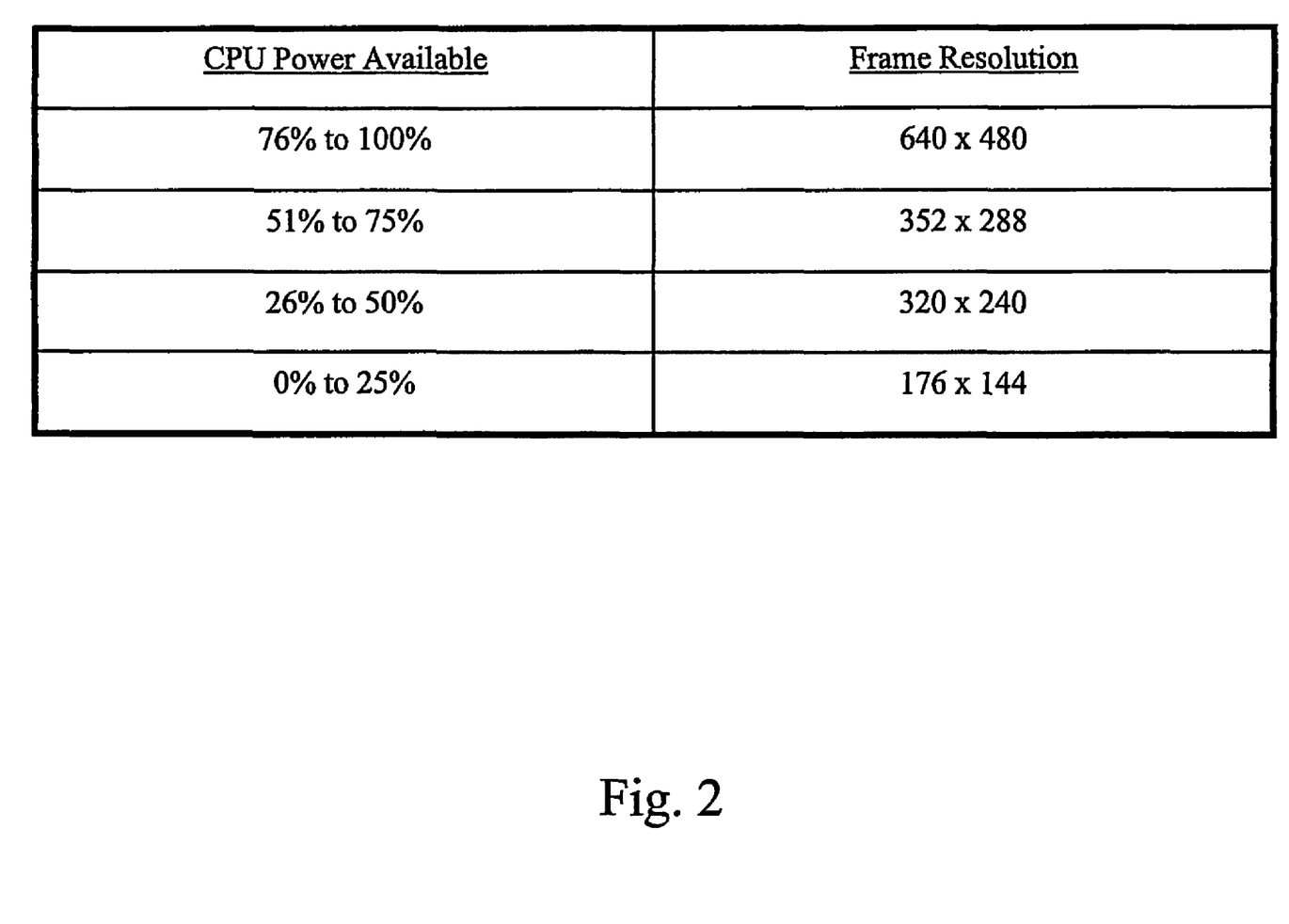
FIG. 2 is a table showing examples of predefined data ranges and corresponding parameter values.

FIG. 2 shows an exemplary table of predefined ranges for the received data and predefined parameters values corresponding to the predefined ranges. In the example of FIG. 2, the first column of the table shows CPU Power Available, described further below, as predefined percentage ranges. The second column of the table shows predefined frame resolutions corresponding to the predefined CPU Power Available percentage ranges. Thus, as described further below, where, for example, the received data indicated CPU Power Available of 60%, VEC System 120 could consult the table of FIG. 2 to determine that a frame resolution of 352×288 to corresponds with the predefined range encompassing the received data. If the current frame resolution at which VET System 110 is encoding the video stream is different, then VEC System 120 would modify the frame resolution parameter to 352×288 to thereby cause VET System 110 to encode the video stream at that frame resolution.

It should be understood that similar tables may be used in relation to other types of data received by VEC System 120, as described further below. Also, it should be understood that the values shown in FIG. 2 are exemplary only and that the values in this table, as well as the values that may be used in similar tables related to other types of data received by VEC System 120 other than CPU Power Available, are exemplary only and may be varied as a matter of design choice for the user and implementer of the invention.

Network 200 encompasses any communication network capable of transporting video streams and related control data. For example, Network 200 may comprise a LAN, WAN, or the Internet.

VC System 300 encompasses any computer system capable of (a) receiving a video stream through a network and decoding the received video stream for presentation to a user, (b) gathering data regarding (i) conditions in the network through which the video stream is being received and (ii) resources available within VC System 300 for decoding the video stream being received, and (c) transmitting the gathered data to the computer system transmitting the video stream being received by VC System 300. VC System 300 may comprise computer code to perform the above functions.

In an embodiment of the invention, VC System 300 comprises a Video Receiving and Decoding ("VRD") System 310 and a Condition Reporting ("CR") System 320. VRD System 310 encompasses any computer system capable of receiving video streams through a network and decoding the received video streams for presentation to a user. For example, VRD System 310 may comprise known video streaming client software, e.g., RealOne™ Player from RealNetworks, Inc. or Windows Media Player™ from Microsoft Corporation.

CR System 320 encompasses any computer system capable of gathering data regarding conditions in the network through which a video stream is being received and resources available within VC System 300 for decoding the video stream being received, and transmitting the gathered data to the computer system transmitting the video stream being received by VC System 300. CR System 320 may comprise computer code for gathering data regarding conditions in a network as well as data regarding the resources available within a computer system according to any known method or technique. The types of data gathered by CR System 320 regarding conditions in a network may include, for example, measurements related to the reception through the network of a video stream currently being received, including, for example, measurements representing the packet loss, bytes transmitted/received, and bit error rate associated with a video stream currently being received through the network. The types of data gathered by CR System 320 regarding resources available within VC System 300 for decoding the received video stream include, for example, measurements representing the memory and CPU power available for decoding the received video stream.

In addition, CR System 320 may comprise computer code for performing the function of transmitting the gathered data to the computer system transmitting the video stream being received by VC System 300. For example, CR System 320 may comprise computer code which, when executed, causes CR System 320 to transmit the gathered data as application specific data in RTCP packets that it sends to the computer system transmitting the video stream being received by VC System 300.

The term "computer system" here is used broadly and encompasses computer hardware and computer software or computer software only. For example, VET System 110 and VEC System 120 each may comprise computer code that resides on the same computer hardware of VS System 100. Alternatively, VET System 110 and VEC System 120 each may be implemented in distinct computer hardware.

Figure 3:
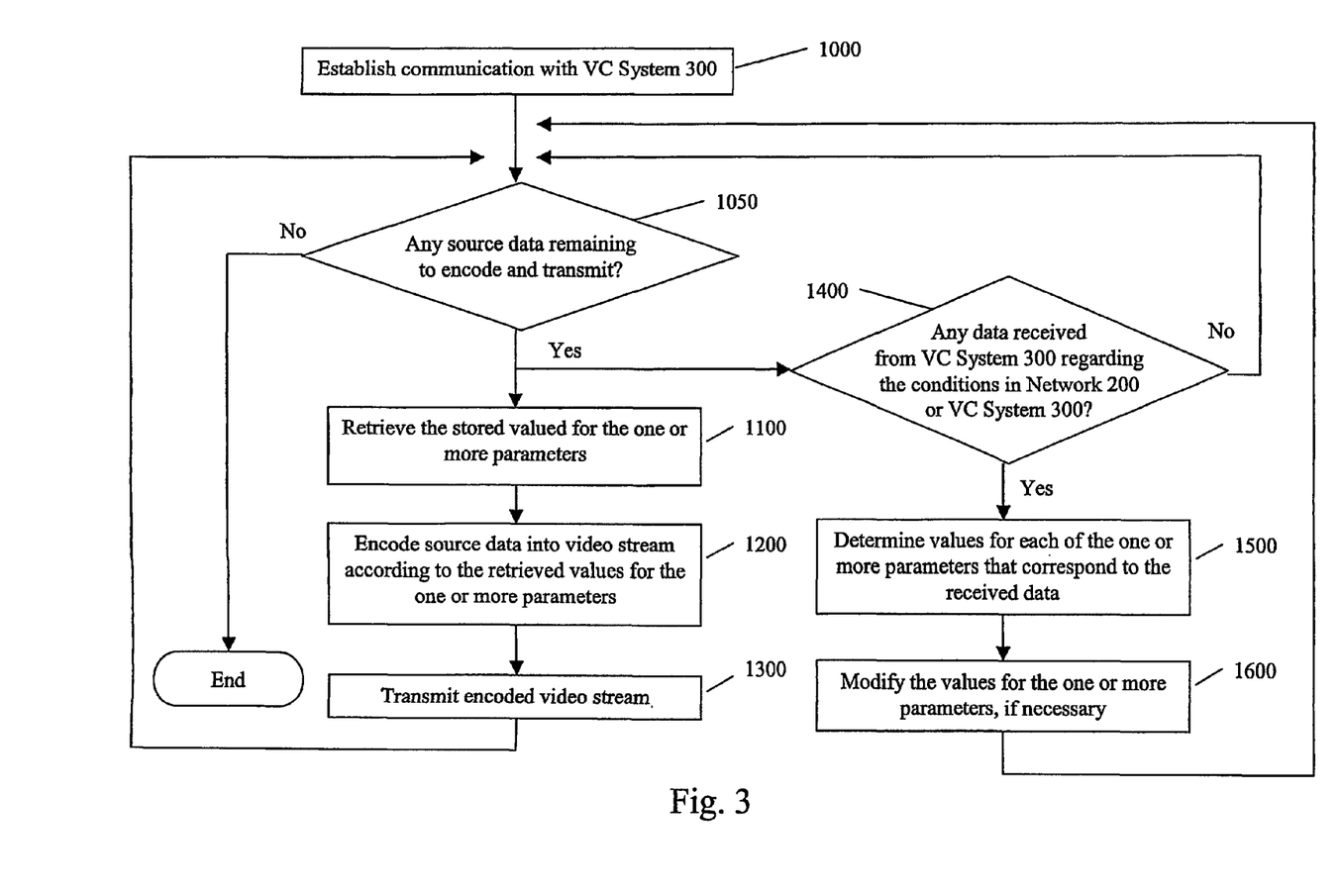
FIG. 3 is a flowchart showing an operative embodiment of the invention.
Figure 4:
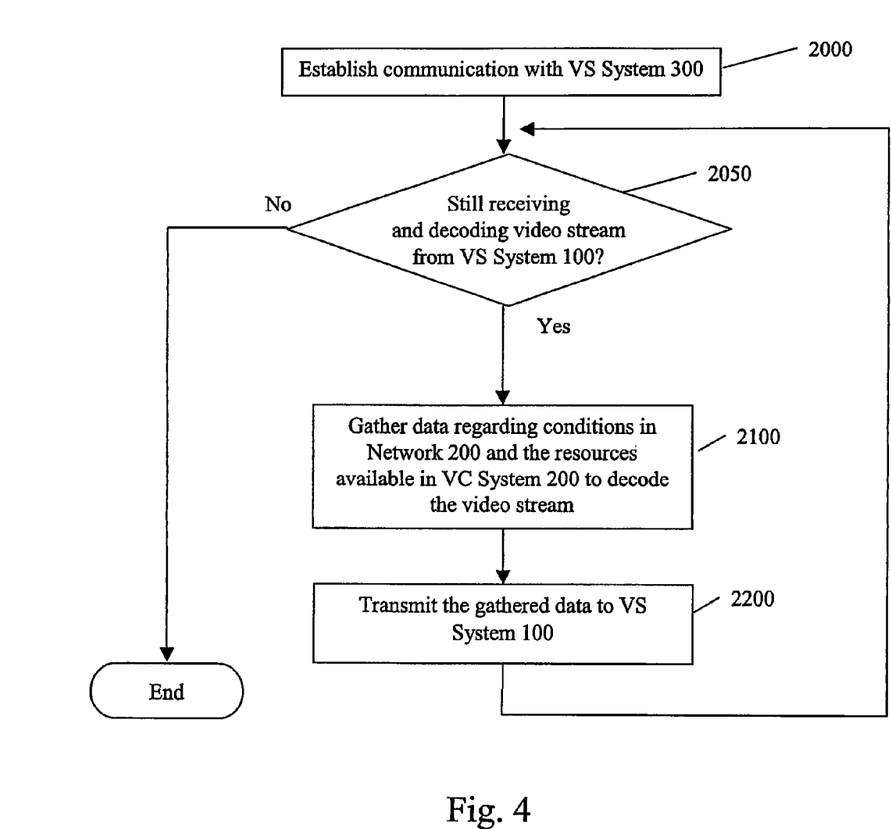
FIG. 4 is a flowchart showing another operative embodiment of the invention.

FIGS. 3 and 4 are flowcharts showing one way in which the present invention may operate, where FIG. 3 shows the operations performed at VS 100 and FIG. 4 shows the operations performed at VC 300. Referring to FIG. 3, first, as represented in block 1000, communications are established with VC System 300. For example, VS System 100 may communicate with VC System 300 to establish an RTP/UDP connection over which encoded video may be transmitted to VC System 300 and an RTCP/UDP connection over which diagnostic information may be received from VC System 300.

Next, as represented in block 1050, a determination may be made as to whether any source data remains to encode and transmit as part of the video stream. For example, where the source data is live video, VET System 110 may make a determination of whether the process of encoding live video is continuing, and where the source data is video data from a stored file that is being transcoded by VS System 100, VET System 110 may make a determination of whether any data remains in the stored video file to be transcoded.

If the determination resulting from the operations represented in block 1050 is negative, then processing terminates at VS System 100. On the other hand, if the determination resulting from the operations represented in block 1050 is positive, then the operations represented in blocks 1100, 1200, and 1300 are performed.

As represented in block 1100, the stored values for the one or more parameters according to which the video stream is encoded are retrieved. For example, VET System 110 may retrieve values for each of the one or more parameters from the storage location associated with each parameter. Next, the source data is encoded into a video stream according to the retrieved values for the one or more parameters, as represented in block 1200. For example, VET System 110 may encode the source data according to a known video compression algorithm, e.g., MPEG or H.263, according to the values retrieved for the one or more parameters previously described, e.g., frame resolution and frame rate. Next, the encoded video stream is transmitted, as represented in block 1300. For example, VET System 110 may transmit the encoded video stream over-Network 200 to VC System 300. Processing then returns to the operations represented in block 1050.

As shown in FIG. 3, if the determination resulting from the operations represented in block 1050 is positive, then in addition to the operations represented in blocks 1100, 1200, and 1300, the operations represented in blocks 1400, 1500, and 1600 are also performed. The operations represented in blocks 1400, 1500, and 1600 may be performed concurrently and independently of the operations represented in blocks 1100, 1200, and 1300.

As represented in block 1400, a determination is made as to whether any data has been received from VC System 300 regarding the conditions in Network 200 or VC System 300. For example, VEC System 120 of VS System 100 may examine the RTCP packets received from VC System 300 over the established RTCP/UDP connection to determine if data has been received from VC System 300 regarding the conditions in Network 200 or the conditions in VC System 300 regarding its ability to decode the video stream in the application specific portion of RTCP packets received from VC System 300. If the determination resulting from the operations represented in block 1400 is negative, then processing returns to the operations represented in block 1050.

If the determination resulting from the operations represented in block 1400 is positive, then processing continues with the operations represented in block 1500, where values for each of the one or more parameters that corresponds to the received data are determined. For example, VEC System 120 may compare the data received from VC System 300 with a table specifying predefined ranges for the type of data received and corresponding values for each of the one or more parameters for each predefined range, as described previously in connection with FIG. 2. For instance, where the data received from VC System 300 represents a measurement of the CPU power available at VC System 300 for decoding the video stream currently being transmitted from VS System 100 to VC System 300, then VEC System 120 may compare the data received from VC System 300 with the table of FIG. 2 to determine the predefined range encompassing the received data and the value for the frame resolution parameter corresponding to this range. For example, if the data received from VC System 300 indicates a measurement of 60% CPU power available at VC System 300 for decoding the video stream being transmitted by VS System 100 to VC System 300, then VEC System 120 would determine 352×288 to be the proper value for the frame resolution parameter corresponding to this received data. In a similar manner, VEC System 120 may determine the values of each of the one or more parameters that corresponds to the data received from VC System 300.

Next, as represented in block 1600, the values of the one or more parameters are modified, if necessary. For example, VEC System 120 may compare the values determined for each of the one or more parameters, from the operations represented in block 1500, with the stored values for each of the one or more parameters. If any of the determined values differs from the stored value for a parameter, VEC System 120 stores the determined value in the storage area associated with the parameter. Processing then goes back to the operations represented in block 1050.

Concurrently, as VS System 100 encodes and transmits a video stream, VC System 300 receives the video stream through Network 200 and decodes it for presentation to a user operating VC System 300. As shown in FIG. 4, first, communications are established with VS System 100, as represented in block 2000. For example, similar to the operations represented in block 1000 of FIG. 3, here VC System 300 may communicate with VS System 100 to establish the RTP/UDP connection over which encoded video may be received from VS System 300 and an RTCP/UDP connection over which diagnostic information may be transmitted to VS System 100. VRD System 310 then begins and continues the process of receiving and decoding the video stream being sent from VS System 100. While VRD System 310 in the receiving and decoding process, CR System 320 continually performs the operations represented in blocks 2050, 2100, and 2200 shown in FIG. 4.

Once the process of decoding the video stream being received from VS System 100 begins, CR System 320 begins monitoring this process, as represented in block 2050, by making a determination of whether this receiving and decoding process is continuing at VRD System 310. If this determination is negative, the processing at CR System 320 terminates.

If this determination is positive, then processing continues with the operations represented in block 2100 where data regarding conditions in Network 200 and the resources available in VC System 200 to decode the video stream are gathered. For instance, with regard to conditions in Network 200, CR System 300 may employ known techniques to obtain data including, for example, measurements representing (a) the packet loss associated with the delivery of the video stream from VS System 100 to VC System 300 through Network 200, (b) the number of bytes transmitted by VS System 100 and the number of bytes received by VC System 300 associated with the delivery of the video stream from VS System 100 to VC System 300 through Network 200, (c) the bit error rate associated with the delivery of the video stream from VS System 100 to VC System 300 through Network 200. Also, with regard to the resources available in VC System 200 to decode the video stream, CR System may employ known techniques to obtain data including, for example, measurements representing the memory available or the CPU power available at VC System 300 to decode the video stream being received from VS System 100. It should be noted that the memory and CPU power available may fluctuate as those resources are used and released for other purposes at VC System 300, e.g., as other application programs are opened or closed at VC System 300. Also, it should be noted that the data described above (e.g., packet loss, bytes transmitted/received, bit error rate, memory available, CPU power available), may be measured in any known manner so long as the standard of measurement used by CR System 320 is the same standard used by VEC System 120 (e.g., CPU power available represented as a percentage of total CPU power by CR System 320 as well as VEC System 120, such as shown in the table of FIG. 2).

Next, the gathered data is transmitted to VS System 100, as represented in block 2200. For example, CR System 320 may transmit the gathered data regarding conditions in Network 200 and the resources available in VC System 200 to decode the video stream as application specific data of RTCP packets that are transmitted back to VS System 100 over the established RTCP/UDP connection. Processing then continues with the operations in block 2050.

Consequently, during the process in which VS System 100 encodes a video stream and transmits the encoded stream to VC System 200, VC System 200 may continually gather data regarding the conditions in Network 200 and in VC System 200 and send this data to VS System 100 for use in adjusting the encoding of the video stream. Thus, as congestion in Network 200 grows or as resources at VC System 200 available for decoding of the received video stream decrease, the data received at VS System 100 may cause it to reduce, for example, the frame resolution of the video stream being encoded. Conversely, as congestion in Network 200 improves or resources are related and made available for video decoding of the received stream at VC System 300, then data received at VS System 100 may cause it to increase, for example, the frame resolution of the video stream being encoded.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for modifying a video stream being encoded according to the values of one or more parameters and being delivered through a network, the method comprising:
   obtaining data related at least to the ability of the network to transport the video stream to a client device and related to the ability of the client to decode the video stream during the delivery of the encoded video stream, wherein the obtaining comprises obtaining a measurement representing resources available at the client device for decoding the video stream being delivered to the client device including at least one of: available processor power able to be used by the client device in decoding the video stream, associated packet loss, and associated bytes transmitted and received; and
   modifying the values of the one or more parameters according to which the video stream is being encoded based on tables of predefined ranges for the obtained data and predefined values corresponding to the predefined ranges, wherein the one or more parameters according to which the video stream is being encoded includes a frame rate and wherein the modifying comprises modifying the frame rate value based on the obtained data; and
   adjusting encoding of the video stream in response to modifying the values of the one or more parameters.

2. The method of claim 1, wherein the client device comprises a computer.

3. The method of claim 1, wherein the client device comprises a cell phone.

4. The method of claim 1, wherein the client device comprises a handheld device.

5. A method for modifying a video stream being encoded according to the values of one or more parameters and being delivered to a computer through a network, the method comprising:
   obtaining data related to the ability of the network to transport the video stream to the computer and related to the ability of the computer to decode the video stream during the delivery of the encoded video stream, wherein the obtaining comprises obtaining a measurement representing resources available at the computer for decoding the video stream being delivered to the computer including at least one of: available processor power able to be used in decoding the video stream, associated packet loss, and associated bytes transmitted and received; and
   modifying the values of the one or more parameters according to which the video stream is being encoded based on tables of predefined ranges for the obtained data and predefined values corresponding to the predefined ranges, wherein the one or more parameters according to which the video stream is being encoded includes a frame rate and wherein the modifying comprises modifying the frame rate value based on the obtained data; and
   adjusting encoding of the video stream in response to modifying the values of the one or more parameters.

6. The method of claim 5, wherein the one or more parameters according to which the video stream is being encoded includes a frame resolution; and
   wherein the modifying comprises modifying the frame resolution value based on the obtained data.

7. The method of claim 5, wherein the obtaining comprises obtaining the data related to the computer or the network in RTCP packets received from the computer.

8. The method of claim 5, wherein the obtaining comprises obtaining the data related to the computer or the network in the application specific portion of the RTCP packets received from the computer.

9. The method of claim 5, wherein the obtaining comprises obtaining a measurement representing a bit error rate associated with the delivery of the video stream through the network to the computer.

10. The method of claim 5, wherein the obtaining comprises:
    gathering the data at the computer; and
    receiving the gathered data from the computer.

11. A method for facilitating the modification of a video stream being encoded by a first computer according to the values of one or more parameters and being transmitted by the first computer through a network to a second computer, the method comprising:
    gathering data at the second computer during the transmission of the encoded video stream by the first computer related to the ability of the network to transport the video stream to the second computer and related to the ability of the second computer to decode the video stream, wherein the gathering data comprises obtaining a measurement representing resources available at the second computer for decoding the video stream being delivered to the second computer including at least one of: available processor power able to be used by the second computer in decoding the video stream, associated packet loss, and associated bytes transmitted and received; and transmitting the gathered data to the first computer during the transmission of the encoded video stream by the first computer to enable the modification of the values of the one or more parameters according to which the first computer is encoding the video stream based on tables of predefined ranges for the obtained data and predefined values corresponding to the predefined ranges and enable the adjustment of the encoding of the video stream in response to the modification of the values of the one or more parameters, wherein the transmitting comprises transmitting the gathered data in the application specific portion of RTCP packets being sent to the first computer.

12. The method of claim 11 wherein the one or more parameters includes a frame rate.

13. A system for modifying a video stream being encoded according to the values of one or more parameters and being delivered through a network, the system comprising:

means for obtaining data related at least to the ability of the network to transport the video stream during the delivery of the encoded video stream, wherein the obtained data relates to the ability of the network to transport the video stream to a client device and relates to the ability of the client device to decode the video stream, and wherein the means for obtaining comprises means for obtaining a measurement representing resources available at the client device for decoding the video stream being delivered to the client device including at least one of: available processor power able to be used by the client device in decoding the video stream, associated packet loss, and bytes transmitted and received; and means for modifying the values of the one or more parameters according to which the video stream is being encoded based on tables of predefined ranges for the obtained data and predefined values corresponding to the predefined ranges, wherein the one or more parameters according to which the video stream is being encoded includes a frame rate, and wherein the means for modifying comprises modifying the frame rate value based on the obtained data; and means for adjusting encoding of the video stream in response to modifying the values of the one or more parameters.

14. The method of claim 13, wherein the client device comprises a computer.

15. The method of claim 13, wherein the client device comprises a cell phone.

16. The method of claim 13, wherein the client device comprises a hand-held device.

17. A system for modifying a video stream being encoded according to the values of one or more parameters and being delivered to a computer through a network, the system comprising:

means for obtaining data related to the ability of the network to transport the video stream to the computer and related to the ability of the computer to decode the video stream during the delivery of the encoded video stream, wherein the means for obtaining comprises means for obtaining a measurement representing resources available at the computer for decoding the video stream being delivered to the computer including at least one of: available processor power able to be used by the computer in decoding the video stream, associated packet loss, and bytes transmitted and received; and means for modifying the values of the one or more parameters according to which the video stream is being encoded based on tables of predefined ranges for the obtained data and predefined values corresponding to the predefined ranges, wherein the one or more parameters according to which the video stream is being encoded includes a frame rate, and wherein the means for modifying comprises modifying the frame rate value based on the obtained data; and means for adjusting encoding of the video stream in response to modifying the values of the one or more parameters.

18. The system of claim 17, wherein the one or more parameters according to which the video stream is being encoded includes a frame resolution; and wherein the means for modifying comprises means for modifying the frame resolution value based on tables of predefined ranges for the obtained data and predefined values corresponding to the predefined ranges.

19. The system of claim 17, wherein the means for obtaining comprises means for obtaining the data related to the computer or the network in RTCP packets received from the computer.

20. The system of claim 17, wherein the means for obtaining comprises means for obtaining a measurement representing a bit error rate associated with the delivery of the video stream through the network to the computer.

21. A system for facilitating the modification of a video stream being encoded by a first computer according to the values of one or more parameters and being transmitted by the first computer through a network to a second computer, the system comprising:

means for gathering data at the second computer during the transmission of the encoded video stream by the first computer related to the ability of the network to transport the video stream to the second computer and related to the ability of the second computer to decode the video stream, wherein the means for gathering data comprises means for obtaining a measurement representing resources available at the second computer for decoding the video stream being delivered to the second computer including at least one of: available processor power able to be used by the second computer in decoding the video stream, associated packet loss, and bytes transmitted and received;

means for transmitting the gathered data to the first computer during the transmission of the encoded video stream by the first computer to enable the modification of the values of the one or more parameters according to which the first computer is encoding the video stream based on tables of predefined ranges for the obtained data and predefined values corresponding to the predefined ranges and enable the adjustment of the encoding of the video stream in response to the modification of the values of the one or more parameters, wherein the means for transmitting comprises means for transmitting the gathered data in the application specific portion of RTCP packets being sent to the first computer.

22. The system of claim 21 wherein the one or more parameters includes a frame rate.

23. A computer program product comprising a computer usable medium having computer readable code embodied therein, the computer readable code, when executed, causing a computer to implement a method for modifying a video stream being encoded according to the values of one or more parameters and being delivered through a network, the method comprising:

obtaining data related at least to the ability of the network to transport the video stream to a client device and related to the ability of the client device to decode the video during the delivery of the encoded video stream, wherein the obtaining comprises obtaining a measurement representing resources available at the client device for decoding the video stream being delivered to the client device including at least one of: available processor power able to be used by the client device in decoding the video stream, associated packet loss, and bytes transmitted and received; and modifying the values of the one or more parameters according to which the video stream is being encoded based on tables of predefined ranges for the obtained data and predefined values corresponding to the predefined ranges, wherein the one or more parameters according to which the video stream is being encoded includes a frame rate, and wherein the modifying comprises modifying the frame rate value based on the obtained data; and adjusting encoding of the video stream in response to modifying the values of the one or more parameters.

24. A computer program product comprising a computer usable medium having computer readable code embodied therein, the computer readable code, when executed, causing a computing device to implement a method for modifying a video stream being encoded according to the values of one or more parameters and being delivered to a computer through a network, the method comprising:

obtaining data related to the ability of the network to transport the video stream to the computer and related to the ability of the computer to decode the video stream during the delivery of the encoded video stream, wherein the obtaining comprises obtaining a measurement representing resources-available at the computer for decoding the video stream being delivered to the computer including at least one of: available processor power able to be used by the computer in decoding the video stream, associated packet loss, and bytes transmitted and received; and modifying the values of the one or more parameters according to which the video stream is being encoded based on tables of predefined ranges for the obtained data and predefined values corresponding to the predefined ranges, wherein the one or more parameters according to which the video stream is being encoded includes a frame rate, and wherein the modifying comprises modifying the frame rate value based on the obtained data; and adjusting encoding of the video stream in response to modifying the values of the one or more parameters.

25. The computer program product of claim 24, wherein the one or more parameters according to which the video stream is being encoded includes a frame resolution; and wherein, in the implemented method, the modifying comprises modifying the frame resolution value based on the obtained data.

26. The computer program product of claim 24, wherein, in the implemented method, the obtaining comprises obtaining the data related to the computer or the network in RTCP packets received from the computer.

27. The computer program product of claim 24, wherein, in the implemented method, the obtaining comprises obtaining a measurement representing a bit error rate associated with the delivery of the video stream through the network to the computer.

28. A computer program product comprising a computer usable medium having computer readable code embodied therein, the computer readable code, when executed, causing a computer to implement a method for facilitating the modification of a video stream being encoded by a first computer according to the values of one or more parameters and being transmitted by the first computer through a network to a second computer, the method comprising:

gathering data at the second computer related to the ability of the network to transport the video stream to the second computer and related to the ability of the second computer to decode the video stream during the transmission of the encoded video stream by the first computer, wherein the gathering comprises obtaining a measurement representing resources available at the second computer for decoding the video stream being delivered to the second computer including at least one of: available processor power able to be used by the second computer in decoding the video stream, associated packet loss, and bytes transmitted and received; and transmitting the gathered data during the transmission of the encoded video stream by the first computer to the first computer to enable the modification of the values of the one or more parameters according to which the first computer is encoding the video stream based on tables of predefined ranges for the obtained data and predefined values corresponding to the predefined ranges and enable the adjustment of the encoding of the video stream in response to the modification of the values of the one or more parameters, wherein the transmitting comprises transmitting the gathered data in the application specific portion of RTCP packets being sent to the first computer.

29. The computer program product of claim 28 wherein the one or more parameters includes a frame rate.

30. A method for facilitating the modification of a video stream being encoded by a computer according to the values of one or more parameters and being transmitted by the computer through a network to a client device, the method comprising:

gathering data at the client device related to the ability of the network to transport the video stream to the client device and related to the ability of the client device to decode the video stream during the transmission of the encoded video stream, wherein the gathering comprises obtaining a measurement representing resources available at the client device for decoding the video stream being delivered to the client device including at least one of: available processor power able to be used by the client device in decoding the video stream, associated packet loss, and bytes transmitted and received; and transmitting the gathered data to the computer to enable the modification of the values of the one or more parameters according to which the computer is encoding the video stream based on tables of predefined ranges for the obtained data and predefined values corresponding to the predefined ranges and enable the adjustment of the encoding of the video stream in response to the modification of the values of the one or more parameters, wherein the transmitting comprises transmitting the gathered data in the application specific portion of RTCP packets being sent to the computer.

31. The method of claim 30 wherein the one or more parameters includes a frame rate.

32. A system for facilitating the modification of a video stream being encoded by a computer according to the values of one or more parameters and being transmitted by the computer though a network to a client device, the system comprising:

means for gathering data at the client device related to the ability of the network to transport the video stream to the client device and related to the ability of the client device to decode the video stream during the transmission of the encoded video stream, wherein the means for gathering comprises means for obtaining a measurement representing resources available at the client device for decoding the video stream being delivered to the client device including at least one of: available processor power able to be used by the client device in decoding the video stream, associated packet loss, and bytes transmitted and received; and means for transmitting the gathered data to the computer to enable the modification of the values of the one or more parameters according to which the computer is encoding the video stream based on tables of predefined ranges for the obtained data and predefined values corresponding to the predefined ranges and enable the adjustment of the encoding of the video stream in response to the modification of the values of the one or more parameters, wherein the means for transmitting comprises means for transmitting the gathered data in the application specific portion of RTCP packets being sent to the computer.

33. The system of claim 32 wherein the one or more parameters includes a frame rate.

* * * * *